United States Patent
Brune et al.

(10) Patent No.: US 6,807,720 B2
(45) Date of Patent: Oct. 26, 2004

(54) INSULATED ELECTRODE PROBE FOR AN ANIMAL RECEIVER COLLAR

(75) Inventors: Scott A. Brune, Leo, IN (US); Matthew R. Williams, Fort Wayne, IN (US); William E. Kaufman, Auburn, IN (US); Gregory S. Stillwell, Fort Wayne, IN (US)

(73) Assignee: Innotek, Inc., Garrett, IN (US)

( * ) Notice: Subject to any disclaimer, the term of this patent is extended or adjusted under 35 U.S.C. 154(b) by 334 days.

(21) Appl. No.: 10/029,324

(22) Filed: Dec. 20, 2001

(65) Prior Publication Data

US 2003/0115740 A1 Jun. 26, 2003

(51) Int. Cl.⁷ .............................................. H01S 4/00
(52) U.S. Cl. ...................... 29/592.1; 29/837; 29/841; 29/885; 427/421
(58) Field of Search ................................ 29/592.1, 837, 29/841, 885; 427/421

(56) References Cited

U.S. PATENT DOCUMENTS

| | | | | |
|---|---|---|---|---|
| 3,874,339 A | * | 4/1975 | Coulbourn ............... | 119/792 |
| 5,193,484 A | | 3/1993 | Gonda ....................... | 119/29 |
| 5,749,143 A | * | 5/1998 | Guillot et al. ............. | 29/841 |
| 6,423,380 B1 | * | 7/2002 | Courtenay ................ | 427/421 |
| 6,446,474 B1 | * | 9/2002 | Tabacchi et al. .......... | 70/16 |

FOREIGN PATENT DOCUMENTS

| | | | | | |
|---|---|---|---|---|---|
| JP | 59145074 A | * | 8/1984 | ............ | B05D/7/14 |
| JP | 03127430 A | * | 5/1991 | ............ | H01J/9/20 |

OTHER PUBLICATIONS

Combined Primate Transport and Restraint Device. REpt. for Mar–Jun 89. ADA223183; Year: 1990.*

* cited by examiner

Primary Examiner—A. Dexter Tugbang
Assistant Examiner—Paul D Kim
(74) Attorney, Agent, or Firm—Taylor & Aust, P.C.

(57) ABSTRACT

A method of manufacturing an electrode probe for use on an animal receiver collar, includes the steps of: providing an electrode probe including a base and a tip, the tip extending from the base and having a contacting end; loading a compliant material and the contacting end together, such that a predetermined portion of the tip is embedded within the compliant material; and depositing an insulating material on at least a portion of the probe not embedded within the compliant material.

19 Claims, 1 Drawing Sheet

INSULATED ELECTRODE PROBE FOR AN ANIMAL RECEIVER COLLAR

BACKGROUND OF THE INVENTION

1. Field of the Invention

The present invention relates to electrode probes for use on an animal receiver collar, and, more particularly, to electrode probes having an outer insulating covering.

2. Description of the Related Art

An animal behavior modification system, such as an electrical training system or containment system, typically includes a collar mounted receiver worn by the animal and a wireless transmitter. The transmitter transmits one or more different types of signals to the receiver unit which in turn applies an appropriate stimulus to the animal, such as a good tone-bad tone, electrical stimulation, vibration, citronella spray, etc.

In the case of a receiver unit which applies an electrical stimulation to the animal, the receiver unit typically includes a pair of electrode probes which are threadingly engaged with threaded terminal posts extending from the receiver unit and through the collar. An electrical potential is applied between the electrode probes resulting in electrical current flowing through the skin of the animal to thereby apply the electrical stimulation to the animal. The particular electrical characteristics of the electrical stimulation which is applied to the animal may vary, depending upon the particular application and/or the signal received from the transmitter.

Other operating or environmental parameters may also affect the correct application of the electrical stimulation to the skin of the animal. For example, if the animal is in water or the fur of the animal is wet, shunting of the electrical current between the electrode probes may occur, resulting in insufficient electrical stimulation being applied to the skin of the animal. U.S. Pat. No. 5,193,484 (Gonda) discloses that insulation may be applied to the lateral side surfaces of electrode probes to prevent electrical shunting therebetween in a wet environment. However, Gonda specifically teaches that although the lateral side surfaces may be insulated, a large portion of the contacting end must be exposed for the electrode probes to work properly.

Notwithstanding assertions by Ghanda to the contrary, the inventors of the present invention have found that effective stimulation can be applied to the skin of the animal when only the very distal end of the electrode probe is exposed.

What is needed in the art is a method of manufacturing an electrode probe in a fast and efficient manner, such that only the distal contacting end of the probe is exposed.

SUMMARY OF THE INVENTION

The present invention provides a method of manufacturing an electrode probe for an animal collar, wherein the probe tip is partially embedded within a compliant material and an insulating material is powder coated on the non-embedded portion of the probe.

The invention comprises, in one form thereof, a method of manufacturing an electrode probe for use on an animal receiver collar, including the steps of: providing an electrode probe including a base and a tip, the tip extending from the base and having a contacting end; loading a compliant material and the contacting end together, such that a predetermined portion of the tip is embedded within the compliant material; and depositing an insulating material on at least a portion of the probe not embedded within the compliant material.

An advantage of the present invention is that the electrode probe may be formed with only the very distal end being exposed for contact with the skin of an animal.

Another advantage is that the insulating material may be quickly and easily applied to the peripheral surfaces of the electrode probe.

Yet another advantage is that the loading force between the electrode probe and the compliant material may be varied, depending upon the type of compliant material and configuration of the electrode probe tip.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
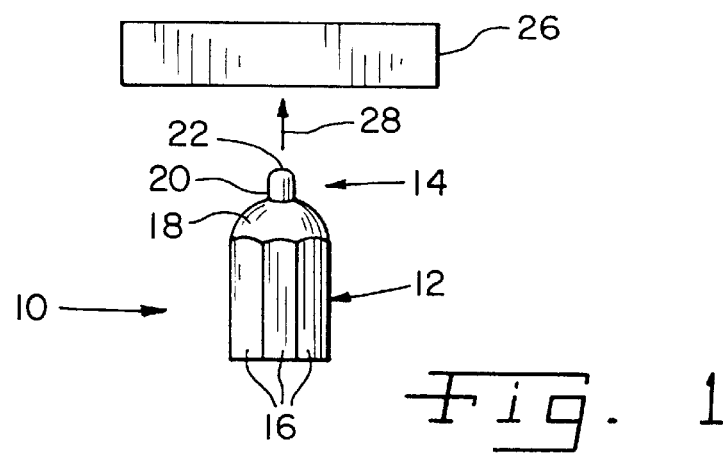
FIG. 1 is a plan view of an electrode probe shown with respect to a compliant material.

Referring now to the drawings, there is shown an embodiment of an electrode probe 10 which is produced by a method of manufacture of the present invention. Electrode probe 10 generally includes a base 12 and a tip 14. Probe 10 is used on an animal receiver collar, such as for remote training or confinement.

Base 12 includes an axially extending, threaded opening (not shown) which screws onto a threaded terminal post extending from a receiver unit (not shown). Hex lands 16 allow probe 10 to be tightened onto the corresponding threaded terminal post of the receiver unit. Curved shoulder 18 defines the transition between hex lands 16 and tip 14. Shoulder 18 may have a selected radius of curvature, depending upon the particular application.

Figure 3:
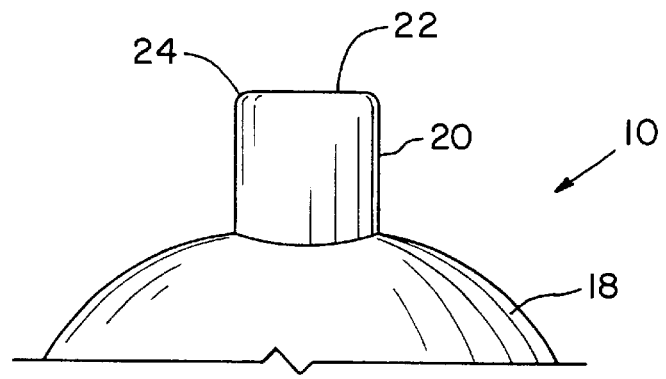
FIG. 3 is an enlarged fragmentary view of another embodiment of an electrode probe with which the method of the present invention may be carried out.

Tip 14 extends from shoulder 18 and includes a cylindrical post 20 and a contacting end 22. End 20 is slightly rounded and includes a perimeter edge adjoining post 20. Alternatively, contacting end 22 may be flattened, such as by using a grinding process, to provide a flat contact surface against the skin of the animal and thereby better distribute the pressure which is applied to the skin (FIG. 3). If contacting end 22 is flattened, a slight radius of curvature 24 is still provided between contacting end 22 and post 20 to prevent exertion of a line pressure against the skin of the animal.

The height of hex lands 16 on base 12 may vary, depending upon the desired length of probe 10. Curved shoulder 18 has a height of aproximently 0.075 inch. Tip 14 also has a diameter of between about 0.10 and 0.20 inch, preferably about 0.140 inch. Base 12 has a diameter of between about 0.20 and 0.40 inch, preferably having a diameter of less than or equal to about 0.275 inch. Tip 14 (including post 20 and contacting end 22) has a length of between about 0.075 and 0.40 inch, preferably having a length of about 0.10 inch.

According to a method of manufacture of the present invention, probe 10 is brought into contact with a compliant material, as indicated by directional arrow 28. Of course, compliant material 26 may be moved towards probe 10, or compliant material 26 and probe 10 can be concurrently moved towards each other. Compliant material 26 and probe 10 are loaded against each other such that a predetermined portion of tip 14 at contacting end 22 is embedded within compliant material 26. The embedded portion of contacting end 22 corresponds to the portion of tip 14 which will not be insulated, and thus acts as the contacting electrode with the skin of the animal. In the embodiment shown, contacting end 22 is embedded within compliant material 26 such that tip 14 has a non-insulated length at contacting end 22 of between about 0.010 and 0.050 inch, preferably about 0.030 inch. In effect, this means only the very distal end of contacting end 22 is exposed as an electrode for contacting the skin and issuing an electrical stimulation to the animal.

In the embodiment shown, probe 10 is constructed from metal, such as stainless steel, and compliant material 26 is constructed from a material which allows contacting end of probe 10 to be embedded therein. Example of a compliant materials which may be utilized with the method of manufacture of the present invention include rubber, felt, foam, certain plastics, etc.

Figure 2:
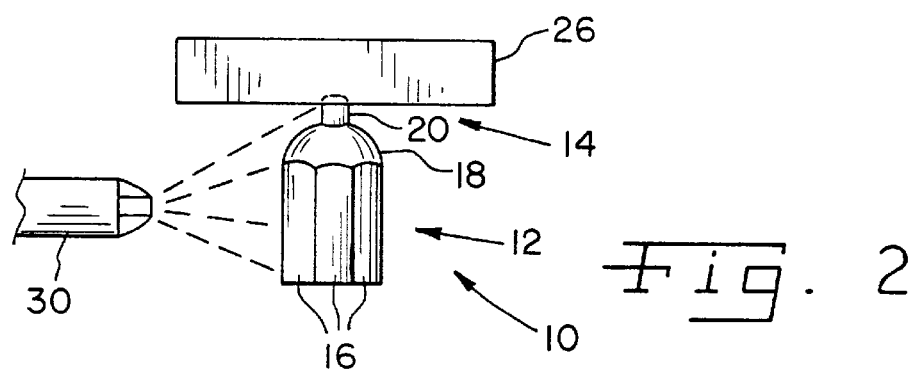
FIG. 2 is another plan view showing the electrode probe tip partially embedded within the compliant material and an insulating material being applied to the peripheral surfaces of the electrode probe.

With contacting end 22 of probe 10 embedded within compliant material 26, an insulating material is deposited on at least a portion of probe 10 not embedded within compliant material 26. Referring to FIG. 2, the insulating material is deposited on the remaining sides of probe 10 not embedded within compliant material 26, except for the base end opposite tip 14. The insulating material is a dielectric material which is applied to probe 10 using a deposition powder coating process. Depending upon the type of dielectric material and the type of material from which probe 10 is constructed, the particular parameters of the powder coating process may vary. Powder coating per se is known for other applications, and thus will not be described in more detail hereinafter with regard to temperatures, coating layer thickness', etc. Suffice it to say that in general, during the deposition powder coating process, a spray nozzle 30 deposits a powder coating onto the portion of probe 10 which is not embedded within compliant material 26. Spray nozzle 30 and/or probe 10 may be rotated during the deposition powder coating process such that the entire peripheral side surfaces of probe 10 are coated with a predetermined thickness of the dielectric material. In the embodiment shown, the dielectric material may be a ceramic or polymeric material (e.g., polyester base, epoxy base or baked on enamel paint), although other dielectric materials may also be utilized.

In the embodiment of the method of manufacture of the present invention described above, the insulating material is deposited onto the probe using a deposition powder coating process, as described above. However, it is also to be understood that the insulating material can be applied to the probe 10 embedded within compliant material 26 using other suitable deposition techniques, such as dipping, etc.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of manufacturing an electrode probe for use on an animal receiver collar, comprising the steps of:

providing an electrode probe including a base and a tip, said tip extending from said base and having a contacting end;

loading a compliant material and said contacting end together, such that a predetermined portion of said tip is embedded within said compliant material; and depositing an insulating material on at least a portion of said probe not embedded within said compliant material; and removing said compliant material from said contacting end.

2. The method manufacturing an electrode probe of claim 1, said depositing step comprising spraying a dielectric material on said probe.

3. The method of manufacturing an electrode probe of claim 2, said depositing step comprising powder coating said dielectric material on said probe.

4. The method of manufacturing an electrode probe of claim 1, said contacting end having a non-insulated length of between about 0.010 and 0.050 inch.

5. The method of manufacturing an electrode probe of claim 4, said contacting end having a non-insulated length of about 0.030 inch.

6. The method of manufacturing an electrode probe of claim 4, said tip having a length of between about 0.075 and 0.4 inch.

7. The method of manufacturing an electrode probe of claim 6, wherein said length is about 0.10 inch.

8. The method of manufacturing an electrode probe of claim 4, said tip having a diameter of between about 0.10 and 0.20 inch.

9. The method of manufacturing an electrode probe of claim 8, wherein said diameter is about 0.140 inch.

10. The method of manufacturing an electrode probe of claim 4, said base having a diameter of between about 0.20 and 0.40 inch.

11. The method of manufacturing an electrode probe of claim 10, wherein said diameter is less than or equal to about 0.275 inch.

12. The method of manufacturing an electrode probe of claim 1, said dielectric material being comprised of a polymeric material.

13. The method of manufacturing an electrode probe of claim 1, wherein said probe is a metallic probe.

14. A method of manufacturing an electrode probe for use on an animal receiver collar, comprising the steps of:

providing an electrode probe including a base and a tip, said tip extending from said base and having a contacting end;

loading a compliant material and said contacting end together, such that said contacting end is embedded within said compliant material a distance of between about 0.010 and 0.050 inch;

deposition powder coating an insulating material on at least a portion of said probe not embedded within said compliant material; and removing said contacting end from said compliant material.

15. The method of manufacturing an electrode probe of claim 14, said contacting end having a non-insulated length of between about 0.0 10 and 0.050 inch.

16. The method of manufacturing an electrode probe of claim 15, wherein said non-insulated length is about 0.030 inch.

17. The method of manufacturing an electrode probe of claim 15, said tip having a diameter of between about 0.10 and 0.20 inch.

18. The method of manufacturing an electrode probe of claim 17, wherein said diameter is about 0.140 inch.

19. The method of manufacturing an electrode probe of claim 14, said dielectric material being comprised of a polymeric material.

* * * * *

UNITED STATES PATENT AND TRADEMARK OFFICE
CERTIFICATE OF CORRECTION

PATENT NO. : 6,807,720 B2
DATED : October 26, 2004
INVENTOR(S) : Brune et al.

It is certified that error appears in the above-identified patent and that said Letters Patent is hereby corrected as shown below:

Column 4,
Line 19, at the end please delete "and"; and
Line 25, between the words "method" and "manufacturing", please insert -- of --.

Column 5,
Line 8, please delete "0.0 10", and substitute therefore -- 0.010 --.

Signed and Sealed this

Third Day of May, 2005

JON W. DUDAS
*Director of the United States Patent and Trademark Office*